US010581282B2

(12) United States Patent
Lovas et al.

(10) Patent No.: US 10,581,282 B2
(45) Date of Patent: Mar. 3, 2020

(54) METHODS AND SYSTEMS FOR FOREIGN OBJECTION DETECTION IN WIRELESS ENERGY TRANSFER SYSTEMS

(71) Applicant: NXP USA, Inc., Austin, TX (US)

(72) Inventors: Ivan Lovas, Prievidza (SK); Zbynek Mynar, Roznov Pod Radhostern (CZ); Jozef Cicka, Cadca (SK)

(73) Assignee: NXP USA, Inc., Austin, TX (US)

( * ) Notice: Subject to any disclaimer, the term of this patent is extended or adjusted under 35 U.S.C. 154(b) by 156 days.

(21) Appl. No.: 15/690,409

(22) Filed: Aug. 30, 2017

(65) Prior Publication Data
US 2019/0068001 A1  Feb. 28, 2019

(51) Int. Cl.
| H02J 50/60 | (2016.01) |
| H02J 50/10 | (2016.01) |
| H02J 50/80 | (2016.01) |
| H02J 7/02  | (2016.01) |

(52) U.S. Cl.
CPC ............. *H02J 50/60* (2016.02); *H02J 7/025* (2013.01); *H02J 50/10* (2016.02); *H02J 50/80* (2016.02)

(58) Field of Classification Search
CPC .................................. H02J 50/60; H02J 50/80
USPC ....................................................... 307/104
See application file for complete search history.

(56) References Cited

U.S. PATENT DOCUMENTS

| 6,972,543 | B1 | 12/2005 | Wells |
| 9,442,172 | B2 | 9/2016 | Verghese et al. |
| 9,474,031 | B1 | 10/2016 | Sedzin et al. |
| 2011/0196544 | A1* | 8/2011 | Baarman ................ H02J 5/005 700/291 |
| 2013/0257168 | A1 | 10/2013 | Singh |
| 2015/0214773 | A1 | 7/2015 | Juan et al. |
| 2016/0020642 | A1 | 1/2016 | Liu et al. |
| 2016/0336759 | A1 | 11/2016 | Yamamoto et al. |
| 2017/0018977 | A1 | 1/2017 | Van Wageningen et al. |

FOREIGN PATENT DOCUMENTS

| EP | 2503663 | A1 | 9/2012 |
| EP | 2803522 | | 11/2014 |

\* cited by examiner

*Primary Examiner* — Rexford N Barnie
*Assistant Examiner* — Joseph N Inge (57) ABSTRACT

Foreign object detection (FOD) is provided for wireless energy transfer systems. A transmitter receives an input voltage, converts it to an output current, supplies the output current to a transmit coil, and samples a first set of analog signals to generate a first set of digital values. A receiver converts a current induced in a receive coil by energy transferred from the transmit coil into an output voltage, samples a second set of analog signals to generate a second set of digital values, and communicates the second set of digital values to the transmitter. The transmitter generates a FOD signal based upon the first and second sets of digital values that indicates detection or non-detection of a foreign object within the energy transfer. In further embodiments, a comparison of the detected power loss or efficiency to expected power loss or efficiency is used to generate the FOD signal.

20 Claims, 5 Drawing Sheets

METHODS AND SYSTEMS FOR FOREIGN OBJECTION DETECTION IN WIRELESS ENERGY TRANSFER SYSTEMS

TECHNICAL FIELD

This technical field relates to wireless energy transfer.

BACKGROUND

Wireless charging uses an electromagnetic field between transmit/receive coils to transfer energy wirelessly between two objects through electromagnetic induction. This wireless energy transfer is usually done with a charging station that transfers energy through inductive coupling to a receiving device. The receiving device then uses that transferred energy to charge batteries or otherwise provide electrical power for the device. For the inductive coupling, wireless chargers typically use a transmit coil to create an alternating electromagnetic field that extends from within a charging base. The receive coil in a nearby rechargeable device draws power from the electromagnetic field and converts it back into direct electric current to charge the battery. The two coils in close proximity to each other effectively form an electrical transformer through which the energy is transferred.

Wireless charging technology has become very popular in a wide range of applications such as cell phones, wearables, medical devices, and other portable rechargeable devices. This wireless charging technology has also been considered for implementation with respect to devices that require more power like laptops, kitchen appliances, robot vacuum cleaners, military devices, and other higher power rechargeable devices. For such higher power implementations, stronger alternating magnetic fields will likely be needed that can lead to health and safety problems. For example, an electrically conductive foreign object that is placed into the stronger alternating magnetic field between the wireless charger and the high-power receiving device can dangerously overheat due to induction of eddy currents. To keep a high level of safety and compatibility, therefore, foreign object detection (FOD) is important to meet requirements for implementations having a wide range of power levels for wireless energy transfer.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed for foreign object detection in wireless energy transfer systems. For the disclosed embodiments, a transmitter receives an input voltage, converts the input voltage to an output current, supplies the output current to a transmit coil, and samples a first set of analog signals associated with the input voltage and the transmit coil to generate a first set of digital values. A receiver converts a current induced in a receive coil by energy transferred from the transmit coil into an output voltage, samples a second set of analog signals associated with the output voltage terminals to generate a second set of digital values, and communicates the second set of digital values to the transmitter. Further, the transmitter generates a foreign object detection (FOD) signal based upon the first set of digital values and the second set of digital values and communicates the FOD signal to a controller for further action. The FOD signal indicates detection or non-detection of a foreign object with respect to the energy transferred from the transmit coil. In further embodiments, the transmitter determines detected power loss or efficiency based upon the first and second set of digital values, estimates expected power loss or efficiency based upon the first and second set of digital values, and generates the FOD signal based upon a comparison of the detected power loss or efficiency and the expected power loss or efficiency. Different features and variations can be implemented, as desired, and related or modified systems and methods can be utilized, as well.

The disclosed embodiments detect foreign objects located within the electromagnetic field generated between a power transmitter (e.g., as part of a wireless charger) and a receiver (e.g., as part of a rechargeable device). Foreign objects including conductive materials (e.g., steel, copper, aluminum, etc.) can be detected, and this detection occurs even if the conductive material is cold on its surface (e.g., an object with a conductive material inside an insulated cover, such as a plastic cover). By detecting such foreign objects within the electromagnetic field, actions and/or alerts can be automatically initiated to help prevent a foreign object from excessive heating and possible damaging health or property. Further, the disclosed embodiments provide this foreign object detection over a wide power range and without requiring a sensor field (e.g., temperature or magnetic field sensors) located at the transmitter. In addition, the disclosed embodiments do not adversely impact or degrade the wireless energy transfer itself between the transmitter and the receiver. Other advantages can also be achieved while taking advantage of the foreign object detection techniques described herein.

Figure 1:
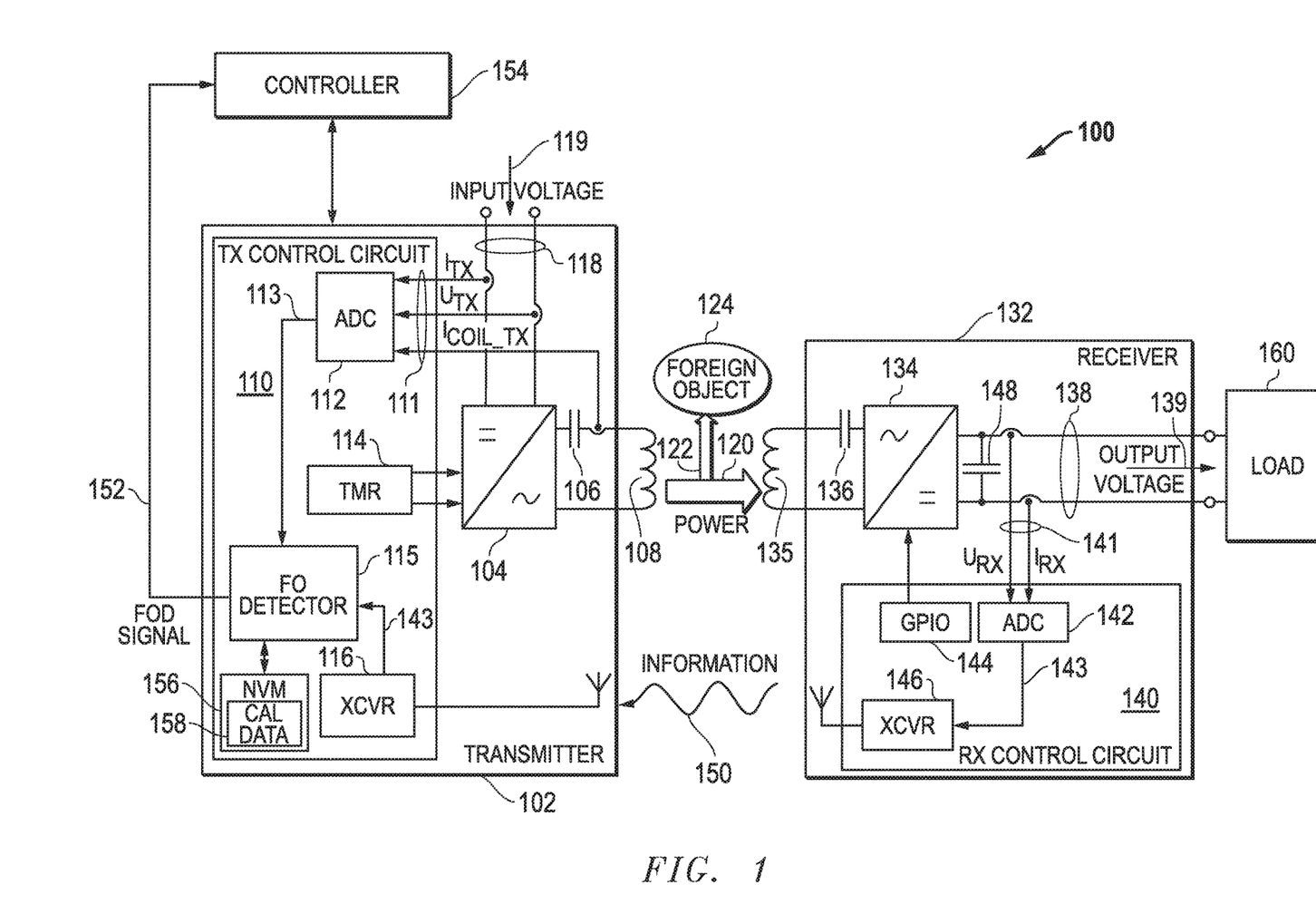
FIG. 1 is a block diagram of an example embodiment for a wireless energy transfer system including a transmitter and a receiver.

FIG. 1 is a block diagram of an example embodiment for a wireless energy transfer system 100 including a transmitter (TX) 102 and a receiver (RX) 132. The transmitter 102 can be included as part of a wide variety of wireless chargers or other devices that operate to provide wireless energy transfer to separate rechargeable or wirelessly powered devices. The receiver 132 can be included as part of a wide variety of rechargeable devices including cell phones, wearables, medical devices, or other portable devices, as well as higher power devices such as laptops, kitchen appliances, robot vacuum cleaners, military devices, or other higher power rechargeable or wirelessly powered devices.

The transmitter 102 includes a transmit (TX) control circuit 110, input voltage terminals 118, a bridge 104, and a transmit coil 108. The input voltage terminals 118 are configured to receive an input voltage 119 that is converted by the bridge 104 into a current passed through the transmit coil 108. A capacitance 106 is also included within one side of the current path for the transmit coil 108. The transmit control circuit 110 includes a transceiver (XCVR) 116, a timer (TMR) 114, an analog-to-digital converter (ADC) 112, a foreign object (FO) detector 115, and a non-volatile memory (NVM) 156 which stores calibration data (CAL DATA) 158. The ADC 112 samples a first set of analog signals 111 associated with the transmit coil 108 and with the input voltage 119 applied to input voltage terminals 118, and the ADC 112 generates a first set of digital values 113 associated with the sampled analog signals 111. The timer (TMR) 114 is configured to control the frequency and duty cycle of the bridge 104 output voltage based on desired output conditions for the receive coil 135 for receiver 132. The transceiver (XCVR) 116 is configured to communicate with the transceiver (XCVR) 146 within the receiver 132. The foreign object (FO) detector 115 operates to generate a foreign object detection (FOD) signal 152 when a foreign object 124 has been detected, as described in further detail herein.

The receiver 132 includes a receive (RX) control circuit 140, output voltage terminals 138, a rectifier 134, and a receive coil 135. The rectifier 134 receives a current induced on the receive coil 135 by the magnetic field generated from the transmit coil 108 and converts this induced current into a voltage on the output voltage terminals 138. A capacitance 136 is also included within one side of the current path for the receive coil 135. The output voltage terminals 138 are configured to provide an output voltage 139 to a load 160, such as a rechargeable battery, electronic circuits, and/or other electrical loads. A capacitance 148 can also be coupled between the output voltage terminals 138. The receive control circuit 140 includes a transceiver (XCVR) 146, a general-purpose input/output (GPIO) circuit 144, and an analog-to-digital converter (ADC) 142. The ADC 142 samples a second set of analog signals 141 associated with the output voltage 139 applied to the output voltage terminals 138, and the ADC 142 generates a second set of digital values 143 associated with the sampled analog values 141. The GPIO circuit 144 is configured to control the operation of the rectifier 134. The transceiver (XCVR) 146 is configured to communicate with the transceiver (XCVR) 116 within the transmitter 102.

It is noted that the ADC 112 within the transmitter 102 can be implemented with electronic circuits that receive analog inputs and generate digital output values (e.g., 8-bit, 16-bit, 32-bit, or other digital output values) that represent the magnitude of the analog inputs. For example, a first channel for ADC 112 can be used to measure the DC (direct current) voltage magnitude for the transmit (TX) input voltage 119. A second channel for ADC 112 can be used to measure the DC input current magnitude for the transmit (TX) input current flowing through the input voltage terminals 118. As part of this current magnitude detection, a shunt resistor, a Hall-effect sensor, and/or other circuitry can be used to facilitate this input current measurement. A third channel for the ADC 112 can be used to detect the magnitude of the alternating current ($I_{COIL\_TX}$) within the transmit coil 108. As part of this coil current magnitude detection, a current sensor, a current transformer, a Hall-effect sensor, a shunt resistor, and/or other circuitry can be used to facilitate this coil current measurement. In addition, various techniques can be used to sample the coil current. For example, to determine the peak coil current, a plurality of samples of coil current per pulse-width-modulation (PWM) period for the output of the bridge 104 (e.g., eight or more samples per PWM period) can be acquired and used to determine a maximum value. This maximum value can then be taken as the peak value of coil current with good precision. In addition, the trigger position for the ADC 112 can also be actively shifted in order to track peak value directly. Other variations could also be implemented.

As with the ADC 112, the ADC 142 within the receiver 132 can also be implemented with electronic circuits that receive analog inputs and generate digital output values (e.g., 8-bit, 16-bit, 32-bit, or other digital output values) that represent the magnitude of the analog inputs. For example, a first channel for ADC 142 can be used to measure the DC (direct current) voltage magnitude for the receive (RX) output voltage 189. A second channel for ADC 142 can be used to measure the DC input current magnitude for the receive (RX) output current flowing through the output voltage terminals 138. As part of this current magnitude detection, a shunt resistor, a Hall-effect sensor, and/or other circuitry can be used to facilitate this input current measurement. Other variations could also be implemented.

It is further noted that the bridge 104 can be implemented with capacitors and intervening switches that are controlled by the timer (TMR) 114 to generate an oscillating current that is output to the transmit coil 108. In addition, the rectifier 134 can be implemented with capacitors and intervening switches that are controlled by the GPIO circuit 144 to generate an output voltage on the output voltage terminals 138. Required output voltage on the output voltage terminal 138 is controlled by transmitter side timer (TMR) 114 and its output frequency and duty cycle to bridge 104.

In operation, the second set of digital values 143 are periodically communicated by the receiver 132 to the transmitter 102, for example, through information 150 communicated wirelessly from the receiver 132 to the transmitter 102 using transceivers 116/146. For example, the second set of digital values 143 can be communicated by the receiver 132 to the transmitter 102 after every oscillation period for the oscillating current provided to the transmit coil 108. Other communication timing could also be used. Once communicated to the transmitter 102, the second set of digital values 143 is then received by the FO detector 115 along with the first set of digital values 113 from the ADC 112. It is noted that the transceivers 116/146 can be implemented using any of a variety of radio types (e.g., Bluetooth, Wi-Fi, NFC (near field communication), and/or other radio types) to provide wireless data transfer between the receiver 132 and the transceiver 116. In addition to such out-band communications, it is also noted that this data transfer between the receiver 132 and the transceiver 116 can also be implemented using in-band techniques, such as for example, modulating the data information onto power signals communicated wirelessly through the coils 108/135. In addition, a direct hardwire connection could also be used, although such a direct connection would typically not be used in a wireless charging environment. Other variations could also be implemented while still taking advantage of the foreign objection detection techniques described herein.

For wireless energy transfer, the magnetic field generated by passing an oscillating current through the transmit coil 108 induces an oscillating current within the receive coil 135. The wireless induction effectively provides an energy transfer of power 120 from the transmitter 102 to the receiver 132. However, if a foreign object (FO) 124 is placed or is otherwise introduced within the magnetic field, a portion 122 of the power 120 being transferred can be absorbed by the foreign object 124. As indicated above, if this foreign object 124 is conductive or can otherwise absorb this portion 122 of the energy being transferred, the foreign object 124 can heat up and/or otherwise cause potential health, security, and/or other dangers with respect to the wireless energy transfer system 100.

According to the embodiments described herein, this foreign object 124 is detected by the foreign object detector 115. In particular, the foreign object (FO) detector 115 generates a foreign object detection (FOD) signal 152 that indicates detection or non-detection of a foreign object 124 with respect to the energy transferred from the transmit coil 135. This FOD signal 152 is based upon the first set of digital values 113 generated by the ADC 112 within the transmitter 102 from the analog signals 111 and is also based upon the second set of digital values 143 generated by the ADC 142 within the receiver 132 from the analog signals 141. Once a foreign object 124 is detected, the transmitter 102 can output the FOD signal 152 for further action. For example, a controller 154 for the wireless energy transfer system 100 can receive the FOD signal 152 and take further action based upon receipt of the FOD signal 152. For example, the controller 154 can communicate with the transmitter 102 and/or additional circuitry, devices, or systems to initiate further actions. These further actions can include, for example, sending notification messages, automatically shutting down the wireless energy transfer, and/or other actions. Other variations could also be implemented while still taking advantage of the foreign objection detection techniques described herein.

Looking now in more detail to the energy transfer for the wireless energy transfer system 100, the transmitter is configured to generate an oscillating magnetic field between transmitter coil 108 and the receiver coil 135 through the operation of the timer (TMR) 114 and the bridge 104. Generally, electrical power (P) for a circuit or device is represented by the product of its received voltage (U) and received current (I) (e.g., P=U×I). There are typically power losses associated with any real-world energy transfer system. For embodiment 100, current flow though circuit components in the wireless energy transfer system 100 will generate hardware power losses ($\Delta P_{HW}$). The total power loss ($\Delta P$) dissipated in the system can be calculated as difference between input power ($P_{IN}$) based upon the current ($I_{TX}$) and voltage ($U_{TX}$) for the input voltage 119 and output power ($P_{OUT}$) based upon the current ($I_{RX}$) and voltage ($U_{RX}$) for the output voltage 139 as follows:

$$\Delta P = P_{IN} - P_{OUT} = (I_{Tx}U_{Tx}) - (I_{Rx}U_{Rx})$$

The presence of a foreign object 124, such as an electrically conductive foreign object (e.g., coins, keys, aluminum foil, copper foil, etc.) in the magnetic field between the coils 108/135 can cause additional power losses because of high frequency eddy currents generated due to the foreign object 124. This additional power loss ($P_{FO}$) due to the foreign object 124 is an unwanted effect and potentially dangerous because the temperature of the foreign object 124 might rise dangerously. This self-consumption by the foreign object ($P_{FO}$) with respect to the total power loss ($\Delta P$) and losses in circuit components ($\Delta P_{HW}$) can be expressed as:

$$P_{FO} = \Delta P - \Delta P_{HW}$$

Losses in circuit components ($\Delta P_{HW}$) can further be represented by losses in transmitter circuits ($\Delta P_{Tx}$) and losses within receiver circuits ($\Delta P_{Rx}$):

$$\Delta P_{HW} = \Delta P_{Tx} + \Delta P_{Rx}$$

For better precision, these two components $\Delta P_{Tx}$ and $\Delta P_{Rx}$ can be further split into transmit (TX) current dependent losses ($\Delta P_{Tx}(it)$), receive (RX) current dependent loses ($\Delta P_{Rx}(ir)$), transmit constant hardware self-consumption ($\Delta P_{Tx\_CONST}$), and receive constant hardware self-consumption ($\Delta P_{Rx\_CONST}$) as follows:

$$\Delta P_{Tx} = \Delta P_{Tx}(it) + \Delta P_{Tx\_CONST}$$

$$\Delta P_{Rx} = \Delta P_{Rx}(ir) + \Delta P_{Rx\_CONST}$$

Substituting into the equation above for self-consumption by the foreign object ($P_{FO}$), $P_{FO}$ then can be expressed as follows:

$$P_{FO} = I_{Tx}U_{Tx} - I_{Rx}U_{Rx} - (\Delta P_{Tx}(it) + \Delta P_{TxCONST} + \Delta P_{Rx}(ir) \Delta P_{RxCONST})$$

The foreign object detection methods described in further detail below for the FO detector 115 are based on calculation of power losses in the air gap between transmitter and receiver coil. The method compares real losses ($\Delta P$) detected in the energy transfer system 100 with expected losses ($\Delta P_{HW}$) that are estimated based upon analog signals sampled within the energy transfer system 100. Differences between real losses and estimated losses are then used to represent power losses in the air gap and magnetic field between the transmit/receive coils 108/135. Because there is typically good coupling and minimal losses in air, it is assumed that losses in the air gap are attributable to losses ($P_{FO}$) due to a foreign object 124. As such, differences between real losses and estimated losses can be compared to a threshold value to determine if a foreign object 124 is present.

It is further noted that many wireless energy transfer systems allow transfer of energy even if the transmit and receive coils are not perfectly aligned in one or more axes. This misaligned operation is called free coil positioning, and the efficiency of the energy transfer system will vary with the position and distance between the transmit and receive coils. It can be difficult for prior systems to determine if power losses are due to misaligned coils or due to a foreign object 124. However, the disclosed embodiments are also able to recognize if the power losses are caused by coil displacement rather than by a foreign object 124 between the transmit/receive coils 108/135.

Figure 2:
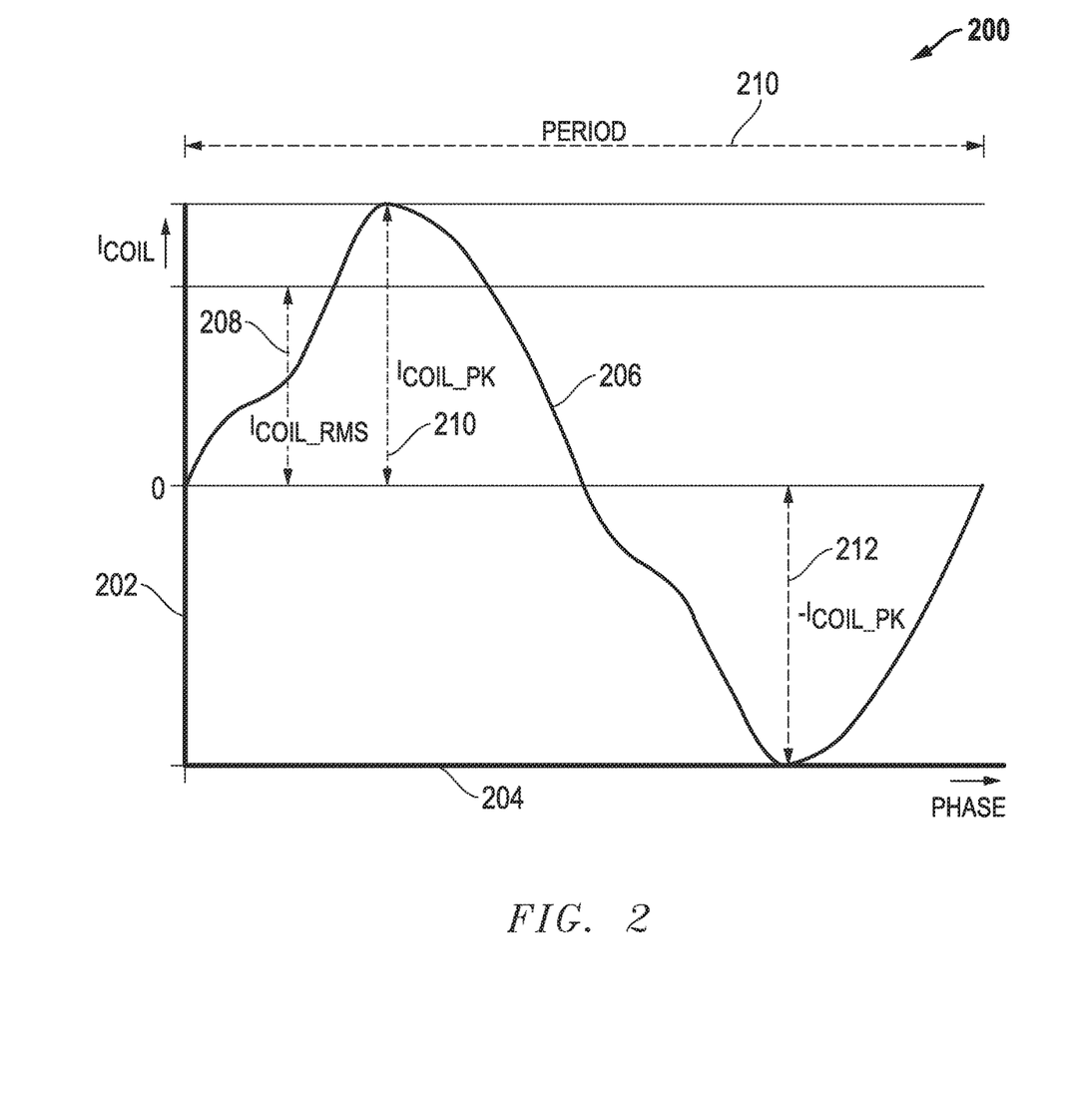
FIG. 2 is a diagram of an example embodiment for the current (Icon) through the transmit coil for one oscillation period of the oscillating output current driven through the transmit coil.

FIG. 2 is a diagram of an example embodiment 200 for the current (Icon) through the transmit coil 108 for one oscillation period 210 of the oscillating output current 206 driven through the transmit coil 108. The y-axis 202 represents the current level, and the x-axis 204 represents the phase of the oscillating output current 206. The RMS (root mean square) current level ($I_{COIL\_RMS}$) 208 is also represented in embodiment 200. To differentiate between efficiency drop due to coil misalignment or due to the presence of a foreign object 124, the positive and negative peak currents 210/212 for the transmit coil 108 are used to determine a peak current ($I_{COIL\_PK}$). The use of this peak current is described in more detail below.

It is noted that the difference between misaligned coils and a foreign object can be seen by looking at two example cases. In both cases, constant power is delivered to receive output load 160, shown in FIG. 1, but the measured efficiency is low. For the first case, the energy transfer system 100 is considered when high coil displacement takes a place. The transmitter 102 is then forced to increase coil current amplitude to transfer energy due to worse coupling. This causes a higher peak current ($I_{COIL\_PK}$) for the transmit coil 108, which in turn causes higher power losses within the components for the circuitry within the transmitter 102. In this case, expected power losses are high as well as measured losses. The relative small difference between these losses can then be used as an indication that a foreign object 124 is not present even if though the system efficiency is low. For the second case, the energy transfer system 100 is considered when coils 108/135 are well aligned, but a foreign object 124 consumes energy from the magnetic field between the coils 108/135. For this second case, the peak current ($I_{COIL\_PK}$) for the transmit coil will remain at a normal value due to the aligned coils. As such, a higher power efficiency will be estimated, and expected power losses will be lower. However, due to actual losses caused by the foreign object ($P_{FO}$) within the magnetic field between the coils 108/135, measured efficiency will be lower and measured power losses will be higher. The relatively large difference found between the expected power losses and the measured power losses can then be used as an indication that a foreign object 124 is present.

Figure 5:
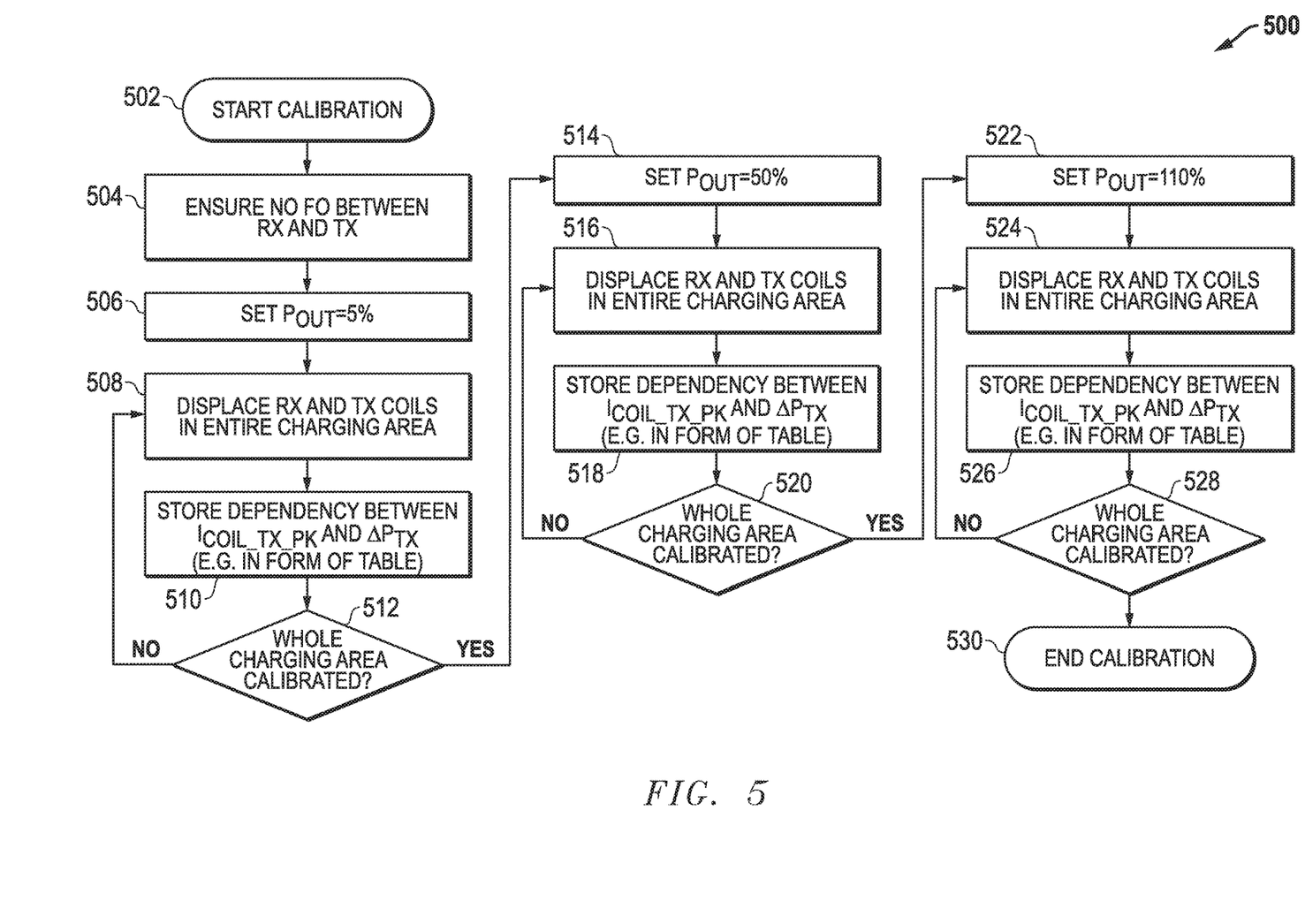
FIG. 5 is a process flow diagram of an example embodiment for post-production calibration that can be used to generate calibration data stored within the transmitter.

It is noted that for some embodiments calibration data (CAL DATA) 158 is used for the foreign object detection. This calibration data can be stored, for example, in a non-volatile memory (NVM) 156. The calibration data 158 associates coil current peak values ($I_{COIL\_PK}$) with expected power losses for the hardware circuit components ($\Delta P_{HW}$). This calibration data 158 can be measured during the pre-production phase for the transmitter 102 by forcing different currents through the transmit coil 108 and then storing the results in control unit 110, such as within the NVM 156. Similarly, calibration data 158 can be stored for calibration currents ($I_{RX}$) injected into the receiver. Calibration data 158 can be stored using a table, a formula (e.g., interpolation using a polynomial equation), and/or through some other technique. This calibration data 158 can also be collected and stored as different sets of calibration data that is dependent upon measured hardware power losses for a wide range of different coil displacements and related current levels where no foreign object 124 is present. The calibration data 158 can be generated after production of systems or devices that will include the transmitter 102 and the receiver 132 through operational testing and measurements. FIG. 5 below provides one example embodiment for generating this calibration data 158. It is noted that there is no requirement for this calibration data 158 to be updated during the product lifetime of the transmitter 102, although such updating could be implemented for particular applications. Other variations could also be implemented while still taking advantage of the foreign object detection techniques described herein.

Figure 3:
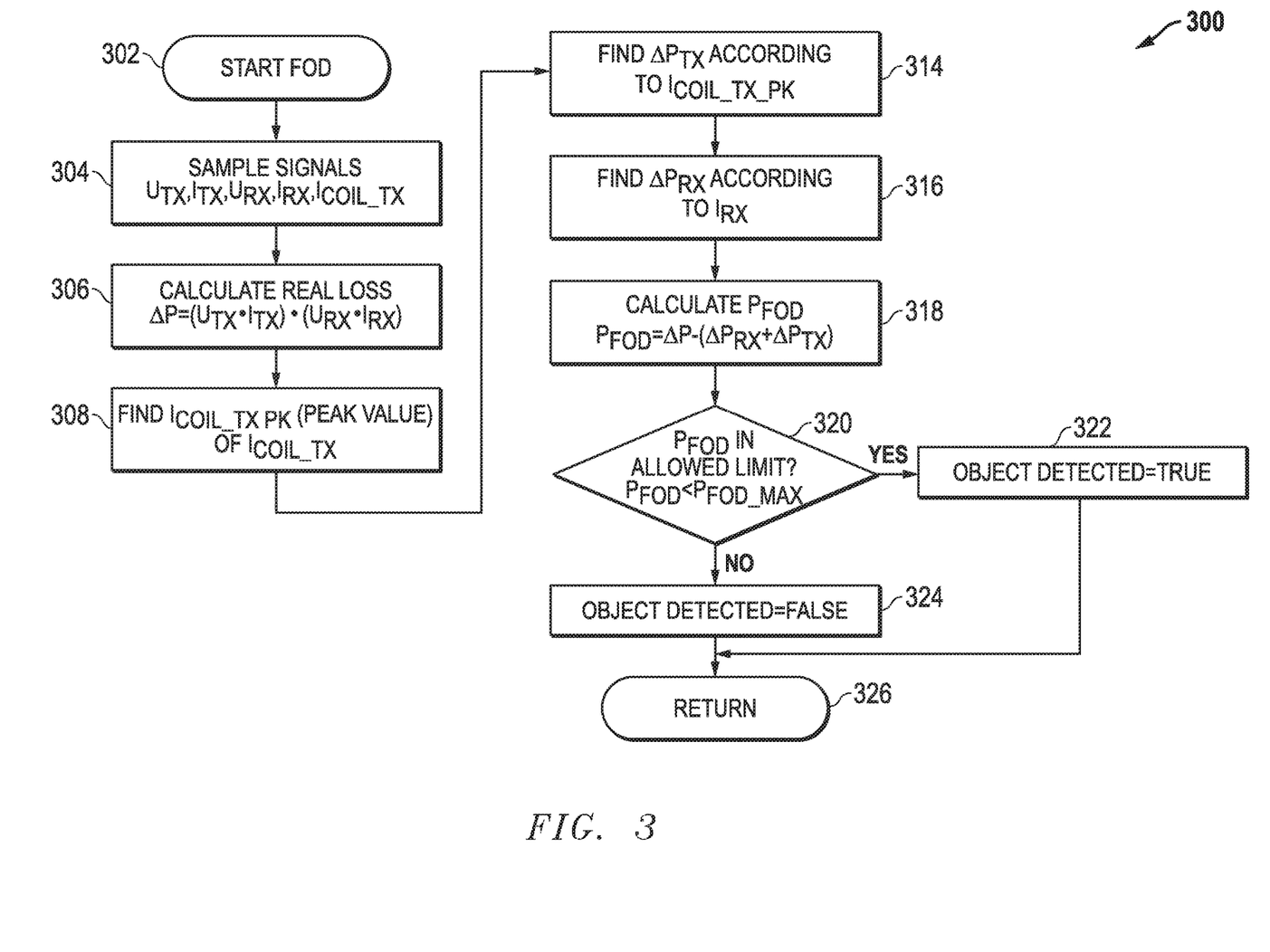
FIG. 3 is a process flow diagram of an example embodiment for detection of a foreign object based upon differences between estimated power and measured power.

FIG. 3 is a process flow diagram of an example embodiment 300 for detection of a foreign object 124 based upon differences between estimated power and measured power. Although estimations of power losses are shown for embodiment 300, power efficiency can also be estimated and used instead as described further below. The detection algorithm is performed periodically when the wireless energy transfer is active for the wireless energy transfer system 100. For some embodiments, the analog signals 111/141 are sampled once per period for the oscillating current driven through the transmit coil 102 except that the transmit coil current ($I_{COIL\_TX}$) is sampled multiple times per oscillation period and preferably at least four (4) times. For example, it has been found that eight (8) samples per oscillation period provide good results for peak current detection. This greater sampling of the transmit coil current ($I_{COIL\_TX}$) allows for the better reconstruction of the current waveform for identification of the current peak ($I_{COIL\_TX\_PK}$). This sampling can be implemented, for example, using ADC circuitry that operates at a relatively fast sampling rate and that rapidly stores measured data into a memory (e.g., using direct memory access). The sampling trigger for the ADC circuitry can also be shifted each period to adjust the sampling points. Once the data acquisition is completed, the detection algorithm uses the digital values generated by the ADC 112 to find current peak ($I_{COIL\_TX\_PK}$) for the transmit coil 108.

Looking now in more detail to FIG. 3, the foreign objection detection (FOD) process starts in block 302. In block 304, analog signals that have been sampled and digitized by the ADCs 112/142 are received by the FO detector 115 as digital values 113/143. These analog signals that are sampled include the transmitter input current ($I_{TX}$), the transmitter input voltage ($U_{TX}$), the transmit coil current ($I_{COIL\-TX}$), the receiver input current ($I_{RX}$), and the transmitter input voltage ($U_{RX}$). In block 306, the real power loss ($\Delta P$) is calculated using the following equation: $\Delta P = (U_{TX}*I_{TX})-(U_{RX}*I_{RX})$. In block 308, the peak value ($I_{COIL\-TX\_PK}$) of the transmit coil current ($I_{COIL\-TX}$) is determined from the multiple samples taken during the oscillation period by the ADC 112.

In block 314, the calibration data 158 is accessed to determine the estimated transmit power loss ($\Delta P_{TX}$) due to circuitry within the transmitter 102 based upon the peak value ($I_{COIL\-TX\_PK}$) determined for the transmit coil current ($I_{COIL\-TX}$). In block 316, the calibration data 158 is accessed to determine the estimated receive power loss ($\Delta P_{RX}$) due to circuitry within the receiver 132 based upon the receive current ($I_{RX}$). In block 318, the power loss difference for the foreign object detection ($P_{FOD}$) is determined based upon the equation: $P_{FOD}=\Delta P-(\Delta P_{RX}+\Delta P_{TX})$. In block 320, a determination is made whether an object has been detected based upon a comparison of the power loss differential ($P_{FOD}$) to a threshold. For example, a determination can be made if the power loss difference ($P_{FOD}$) is within an allowed limit according to the equation: $P_{FOD}<P_{FOD\_MAX}$, where the $P_{FOD\_MAX}$ represents a maximum threshold value selected for the determination block 320. If the determination in block 320 is "NO," then block 324 is reached where the foreign objected detected determination is FALSE. The FOD signal 152 is then used to indicate non-detection of a foreign object within respect to the energy transferred from the transmit coil to the receive coil. For example, a low logic level for the FOD signal 152 can be used to indicate such a non-detection of a foreign object. If the determination in block 320 is "YES," then block 322 is reached where the foreign object detected determination is TRUE. The FOD signal 152 is then used to indicate detection of a foreign object within respect to the energy transferred from the transmit coil to the receive coil. For example, a high logic level for the FOD signal 152 can be used to indicate such a detection of a foreign object. The FOD process then ends in block 326.

It is noted that the FOD signal 152 can also be output in different ways to identify detection or non-detection of a foreign object 124. For example, opposite logic levels could be used; digital words could be used; and/or other signal types could be used for the FOD signal 152. Other variations could also be implemented while still taking advantage of the foreign object detection techniques described herein.

Figure 4:
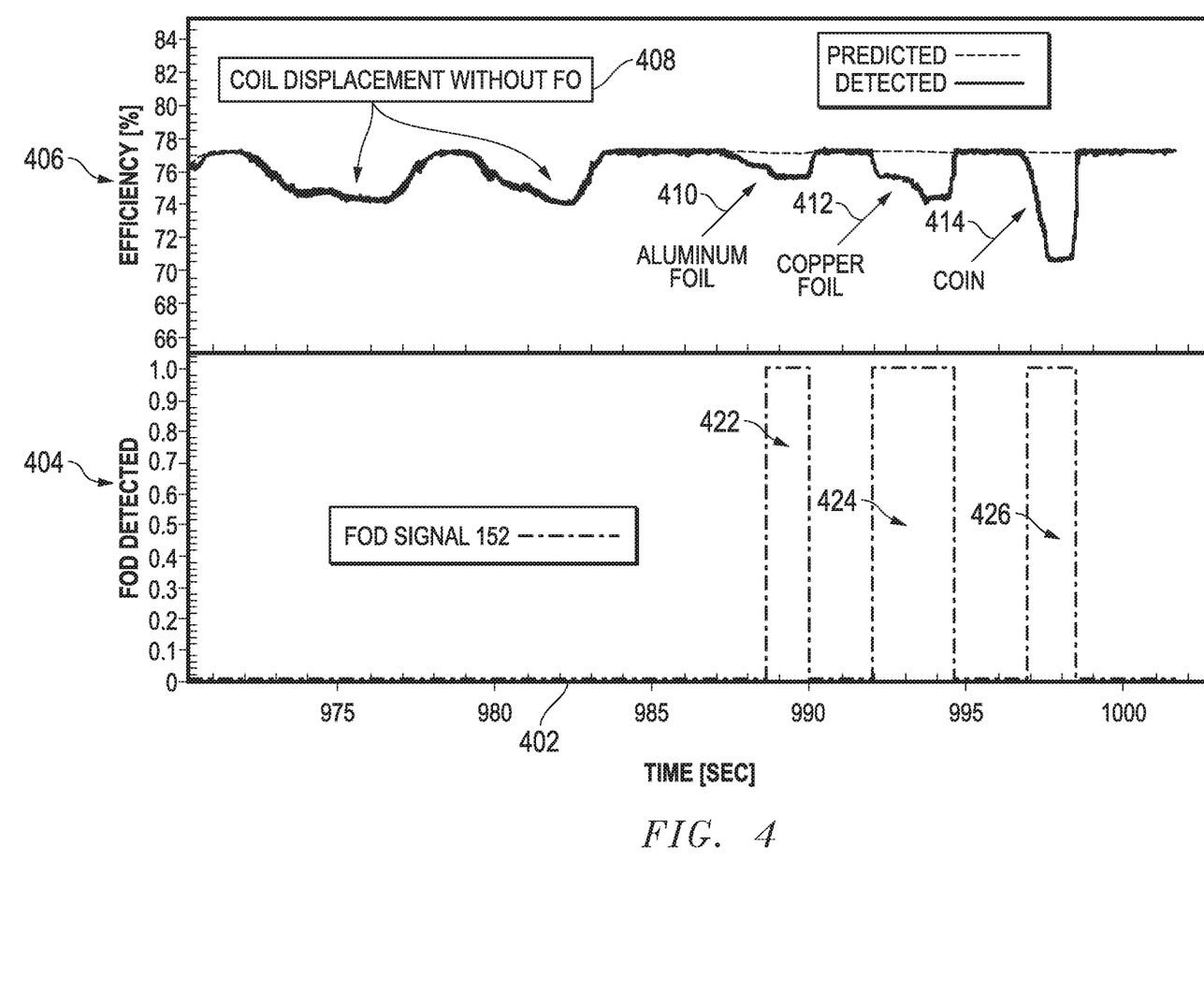
FIG. 4 is a diagram for example measurements associated with the foreign object detection process of FIG. 3.

FIG. 4 is a diagram for example measurements associated with the FOD process of FIG. 3. The x-axis 402 represents time (seconds). The top portion 406 of the y-axis in FIG. 4 provides power efficiency percentages. The bottom portion 404 of the y-axis in FIG. 4 provides the resulting FOD signal 152 for the example conditions in the top portion 406. In particular, examples are provided for coil displacement without foreign objects (block 408), presence of aluminum foil as a foreign object (arrow 410), presence of copper foil as a foreign object (arrow 412), and presence of a coin as a foreign object (arrow 414). It is noted that power efficiency is used in FIG. 4 instead of difference values, which are used in FIG. 3. As indicated above, power loss values or efficiencies can be used with respect to the FOD process in FIG. 3. The power efficiency percentage (EFF) can be represented as estimated expected output power or measured output power divided by the total input power as follows:

$$EFF_{REAL}=(I_{RX}*U_{RX})/(I_{TX}*U_{TX}) \text{(expressed as a percentage)}$$

$$EFF_{EST}=[(I_{TX}*U_{TX})-(\Delta P_{TX}+\Delta P_{RX})]/I_{TX}*U_{TX} \text{(expressed as a percentage)}$$

When efficiencies are used for FIG. 3, then the $P_{FOD}$ calculated in block 318 would be represented by: $P_{FOD}=EFF_{EST}-EFF_{REAL}$. The threshold comparison would still be used; however, the threshold would represent an efficiency difference rather than a power loss value difference.

Looking now in more detail to the top portion 406, block 408 represents coil displacement without foreign objects (FO) and the related arrows point to associated power efficiency losses. For these losses, the predicted power losses were relatively close to the detected power losses. However, where foreign objects are present, the predicted power losses were significantly different from the detected power losses. These power differences are shown with respect to arrow 410 for aluminum foil, arrow 412 for copper foil, and arrow 414 for a coin.

Looking now in more detail to the bottom portion 404, the resulting FOD signal 152 is shown. For the coil displacement with respect to block 408, the FOD signal 152 remained at a low logic level indicating a non-detection or FALSE determination of a foreign object. For the foreign objects 410/412/414, however, the FOD signal 152 rose to a high level in regions 422/424/426 until the object was removed, thereby indicating a detection or TRUE determination of a foreign object. As such, it is seen that the foreign objects were correctly determined to be present while the coil displacement was correctly determined not to represent the presence of a foreign object.

It is noted that the test measurements associated with FIG. 4 were conducted at constant transmitter output power of 40 W. The transmit/receive coil displacement 408 was altered in all axes at the beginning of the experiment (e.g., time before 985 second mark). The FOD signal 152 remaining at its non-detection level showed that the FOD process of FIG. 3 adapted well to coil displacement and correctly determined that no foreign object was within the magnetic field between the coils. In the following time, three different reference foreign objects of different materials (e.g., aluminum foil, copper foil, and coin) were inserted into the magnetic field between the coils. The FOD signal 152 rising to a detection level as a result of the large differences between estimated and measured power efficiency and then falling when the foreign object was removed showed that the FOD process of FIG. 3 correctly determined the presence of the foreign objects and their removal. Further testing was also conducted in transmitter power output ranges from 3 W (watts) to 80 W. Detection thresholds ($P_{FOD\_MAX}$) were set from 300 mW (milliwatt) to 1000 mW with good results with respect to the detection of foreign objects and their heating. The FOD process of FIG. 3 was found to reliably identify the three test objects at these power levels and thresholds. It is further noted that for low power solutions (e.g., 5-15 W) detection thresholds including 300 mW, 600 mW, or 1000 mW can be used, although other values could be used if desired. For high power solutions (e.g., 80 W and above), a minimal detection threshold of 500 mW can be used as a good compromise between sensitivity and reliability, although other values could also be used if desired.

FIG. 5 is a process flow diagram of an example embodiment 500 for post-production calibration that can be used to generate calibration data 158 stored within the transmitter 102. The calibration data 158 is measured and collected to show dependency between the peak current ($I_{COIL\_PK}$) for the transmit coil and power losses in the transmit (TX) circuitry. To cover the whole range of possible peak currents, it is helpful to perform calibration at least for a lowest expected output power and a highest expected output power. For example, calibration can be measured and collected for a number of different output power points associated with a nominal output power. For example embodiment 500, three output power points are used, and they are set to a low, middle, and high output power levels (e.g., 5%, 50%, and 110%), although more and/or different data can be measured and collected if desired.

Looking in more detail to FIG. 5, calibration is started in block 502. In block 504, it is ensured that no foreign object (FO) is located between the receiver (RX) and the transmitter (TX). In block 506, the output power ($P_{OUT}$) is set to 5% of a nominal output power level. In block 508, the transmit (TX) and receive (RX) coils 108/135 are displaced with respect to each other across the entire charging area. In block 510, the dependency between the peak value ($I_{COIL-TX\_PK}$) of the transmit coil current ($I_{COIL-TX}$) and the change in transmit power losses ($\Delta P_{TX}$) is collected and stored, for example, in the form of a table. A determination is then made in block 512 whether the whole charging area has been calibrated. If "NO," then flow passes back to block 508. If "YES," then flow passes to block 514. In block 514, the output power ($P_{OUT}$) is set to 50% of a nominal output power level. In block 516, the transmit (TX) and receive (RX) coils 108/135 are displaced with respect to each other across the entire charging area. In block 518, the dependency between the peak value ($I_{COIL-TX\_PK}$) of the transmit coil current ($I_{COIL\_TX}$) and the change in transmit power losses ($\Delta P_{TX}$) is collected and stored, for example, in the form of a table. A determination is then made in block 520 whether the whole charging area has been calibrated. If "NO," then flow passes back to block 516. If "YES," then flow passes to block 522. In block 522, the output power ($P_{OUT}$) is set to 110% of a nominal output power level. In block 524, the transmit (TX) and receive (RX) coils 108/135 are displaced with respect to each other across the entire charging area. In block 526, the dependency between the peak value ($I_{COIL-TX\_PK}$) of the transmit coil current ($I_{COIL-TX}$) and the change in transmit power losses ($\Delta P_{TX}$) is collected and stored, for example, in the form of a table. A determination is then made in block 528 whether the whole charging area has been calibrated. If "NO," then flow passes back to block 524. If "YES," then flow passes to block 530 where the calibration process ends.

As described herein, a variety of embodiments can be implemented and different features and variations can be implemented, as desired.

For one embodiment, a method for wireless energy transfer is disclosed including, at a transmitter for wireless energy transfer, receiving an input voltage, converting the input voltage to an output current, supplying the output current to a transmit coil, sampling a first set of analog signals associated with the input voltage and the transmit coil to generate a first set of digital values, receiving a second set of digital values communicated from a receiver for the wireless energy transfer where the second set of digital values represents a second set of analog signals associated with an output voltage generated by the receiver from the wireless energy transfer. And generating a foreign object detection (FOD) signal based upon the first set of digital values and the second set of digital values where the FOD signal indicates detection or non-detection of a foreign object with respect to the energy transferred from the transmit coil. In further embodiments, the method includes communicating the FOD signal to a controller for further action.

In additional embodiments, the method includes, at the receiver for the wireless energy transfer, converting a current induced in a receive coil by energy transferred from the transmit coil into the output voltage, sampling the second set of analog signals associated with the output voltage to generate the second set of digital values, and communicating the second set of digital values to the transmitter. In further embodiments, the communicating at the receiver includes wirelessly transmitting the second set of digital values to the transmitter.

In additional embodiments, the generating includes determining detected power loss or efficiency based upon the first and second sets of digital values, estimating expected power loss or efficiency based upon the first and second sets of digital values, and generating the FOD signal based upon a comparison of the detected power loss or efficiency and the expected power loss or efficiency. In further embodiments, the method includes outputting the FOD signal to indicate that a foreign object has been detected if the expected power loss or efficiency differs from the detected power loss or efficiency by more than a threshold value.

In additional embodiments, the first set of analog signals includes a current associated with the input voltage, a voltage associated with the input voltage, and a current associated with the transmit coil. Further, the second set of analog signals includes a current associated with the output voltage and a voltage associated with the output voltage.

In additional embodiments, the output current includes an oscillating output current, and the sampling includes sampling the oscillating output current a plurality of times within an oscillation period for the oscillating output current to generate a plurality of samples. Further, the generating includes determining a peak value for the oscillating output current within the oscillation period from the plurality of samples and basing the FOD signal at least in part upon the peak value. In further embodiments, the generating also includes determining detected power loss or efficiency based upon the first and second sets of digital values, estimating expected power loss or efficiency based upon the peak value and the second sets of digital values, and generating the FOD signal based upon a comparison of the detected power loss or efficiency and the expected power loss or efficiency. In still further embodiments, the estimating expected power loss or efficiency includes accessing calibration data associated with the peak value.

For one embodiments, a system for wireless energy transfer is disclosed including a transmitter for the wireless energy transfer that includes a transmit coil, a bridge coupled to receive an input voltage and to provide an output current to the transmit coil, and an analog-to-digital converter (ADC) coupled to sample a first set of analog signals associated with the input voltage and the transmit coil and to generate a first set of digital values. Further, the transmitter is configured to receive a second set of digital values from a receiver for the wireless energy transfer where the second set of digital values represents a second set of analog signals associated with an output voltage generated by the receiver from the wireless energy transfer, and is further configured to generate a foreign object detection (FOD) signal based upon the first set of digital values and the second set of digital values where the FOD signal indicates detection or non-detection of a foreign object with respect to the energy transferred from the transmit coil. In further embodiments, the transmitter is also configured to communicate the FOD signal to a controller for further action.

In additional embodiments, the system includes a receiver for the wireless energy transfer where the receiver includes a receive coil, a rectifier coupled to receive a current from the receive coil and to provide the output voltage, and an analog-to-digital converter (ADC) coupled to sample the second set of analog signals associated with the output voltage to generate the second set of digital values. Further, the receiver is configured to communicate the second set of digital values to the transmitter. In further embodiments, the receiver is configured to wirelessly transmit the second set of digital values to the transmitter.

In additional embodiments, the transmitter is further configured to determine detected power loss or efficiency based upon the first and second sets of digital values, to estimate expected power loss or efficiency based upon the first and second sets of digital values, and to generate the FOD signal based upon a comparison of the detected power loss or efficiency and the expected power loss or efficiency. In further embodiments, the FOD signal is configured to indicate that a foreign object has been detected if the expected power loss or efficiency differs from the detected power loss or efficiency by more than a threshold value.

In additional embodiments, the first set of analog signals includes a current associated with the input voltage, a voltage associated with the input voltage, and a current associated with the transmit coil. Further, the second set of analog signals includes a current associated with the output voltage and a voltage associated with the output voltage.

In additional embodiments, the output current includes an oscillating output current, and the transmitter is further configured to sample the oscillating output current a plurality of times within an oscillation period for the oscillating output current to generate a plurality of samples, to determine a peak value for the oscillating output current within the oscillation period from the plurality of samples, and to base the FOD signal at least in part upon the peak value. In further embodiments, the transmitter is further configured to detect power loss or efficiency based upon the first and second sets of digital values, to estimate expected power loss or efficiency based upon the peak value and the second sets of digital values, and to generate the FOD signal based upon a comparison of the detected power loss or efficiency and the expected power loss or efficiency. In still further embodiments, the transmitter is further configured to estimate the expected power loss or efficiency based upon calibration data associated with the peak value.

It is further noted that the functional blocks, devices, and/or circuitry described herein (including the controller 154, the transmit control circuit 110, and the receive control circuit 140) can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software, firmware, and/or other program instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are used to program the one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for wireless energy transfer, comprising:
   at a transmitter for wireless energy transfer:
      receiving an input voltage;
      converting the input voltage to an output current;
      supplying the output current to a transmit coil;
      sampling a first set of analog signals associated with the input voltage and the transmit coil to generate a first set of digital values;
      receiving a second set of digital values communicated from a receiver for the wireless energy transfer, the second set of digital values representing a second set of analog signals associated with an output voltage generated by the receiver from the wireless energy transfer; and
      generating a foreign object detection (FOD) signal based upon the first set of digital values and the second set of digital values, the FOD signal indicating detection or non-detection of a foreign object with respect to the energy transferred from the transmit coil;
   wherein the generating further comprises determining detected power loss or efficiency based upon the first and second sets of digital values, estimating expected power loss or efficiency based upon a peak value and the second sets of digital values, and generating the FOD signal based upon a comparison of the detected power loss or efficiency and the expected power loss or efficiency; and
   wherein the estimating comprises estimating expected power loss or efficiency by accessing calibration data associated with the peak value, the calibration data including data collected at two or more power levels so that the calibration data includes a first set of data collected with output power set at a first power level and a second set of data collected with output power set at a second power level.

2. The method of claim 1, further comprising communicating the FOD signal to a controller for further action.

3. The method of claim 1, further comprising at the receiver for the wireless energy transfer:
   converting a current induced in a receive coil by energy transferred from the transmit coil into the output voltage;
   sampling the second set of analog signals associated with the output voltage to generate the second set of digital values; and
   communicating the second set of digital values to the transmitter.

4. The method of claim 3, wherein the communicating at the receiver comprises wirelessly transmitting the second set of digital values to the transmitter.

5. The method of claim 1, wherein the generating comprises determining detected power loss or efficiency based upon the first and second sets of digital values, estimating expected power loss or efficiency based upon the first and second sets of digital values, and generating the FOD signal based upon a comparison of the detected power loss or efficiency and the expected power loss or efficiency.

6. The method of claim 5, further comprising outputting the FOD signal to indicate that a foreign object has been detected if the expected power loss or efficiency differs from the detected power loss or efficiency by more than a threshold value.

7. The method of claim 1, wherein the first set of analog signals comprises a current associated with the input voltage, a voltage associated with the input voltage, and a current associated with the transmit coil; and wherein the second set of analog signals comprises a current associated with the output voltage and a voltage associated with the output voltage.

8. The method of claim 1, wherein the output current comprises an oscillating output current, wherein the sampling comprises sampling the oscillating output current a plurality of times within an oscillation period for the oscillating output current to generate a plurality of samples, and wherein the generating comprises determining the peak value for the oscillating output current within the oscillation period from the plurality of samples and basing the FOD signal at least in part upon the peak value.

9. The method of claim 1, wherein the two or more power levels include at least a lowest expected output power and a highest expected output power.

10. The method of claim 1, wherein the two or more power levels include at least three output power levels.

11. A system for wireless energy transfer, comprising:
   a transmitter for the wireless energy transfer, comprising:
      a transmit coil;
      a bridge coupled to receive an input voltage and to provide an output current to the transmit coil; and
      an analog-to-digital converter (ADC) coupled to sample a first set of analog signals associated with the input voltage and the transmit coil and to generate a first set of digital values;

wherein the transmitter is configured to receive a second set of digital values from a receiver for the wireless energy transfer, the second set of digital values representing a second set of analog signals associated with an output voltage generated by the receiver from the wireless energy transfer, and is further configured to generate a foreign object detection (FOD) signal based upon the first set of digital values and the second set of digital values, the FOD signal indicating detection or non-detection of a foreign object with respect to the energy transferred from the transmit coil;

wherein the transmitter is further configured to detect power loss or efficiency based upon the first and second sets of digital values, to estimate expected power loss or efficiency based upon a peak value and the second sets of digital values, and to generate the FOD signal based upon a comparison of the detected power loss or efficiency and the expected power loss or efficiency; and wherein the transmitter is further configured to estimate the expected power loss or efficiency based upon calibration data associated with the peak value, the calibration data including data collected at two or more power levels so that the calibration data includes a first set of data collected with output power set at a first power level and a second set of data collected with output power set at a second power level.

12. The system of claim 11, wherein the transmitter is further configured to communicate the FOD signal to a controller for further action.

13. The system of claim 11, further comprising a receiver for the wireless energy transfer, the receiver comprising:
a receive coil;
a rectifier coupled to receive a current from the receive coil and to provide the output voltage; and
an analog-to-digital converter (ADC) coupled to sample the second set of analog signals associated with the output voltage to generate the second set of digital values;

wherein the receiver is further configured to communicate the second set of digital values to the transmitter.

14. The system of claim 13, wherein the receiver is configured to wirelessly transmit the second set of digital values to the transmitter.

15. The system of claim 11, wherein the transmitter is further configured to determine detected power loss or efficiency based upon the first and second sets of digital values, to estimate expected power loss or efficiency based upon the first and second sets of digital values, and to generate the FOD signal based upon a comparison of the detected power loss or efficiency and the expected power loss or efficiency.

16. The system of claim 15, wherein the FOD signal is configured to indicate that a foreign object has been detected if the expected power loss or efficiency differs from the detected power loss or efficiency by more than a threshold value.

17. The system of claim 11, wherein the first set of analog signals comprises a current associated with the input voltage, a voltage associated with the input voltage, and a current associated with the transmit coil; and wherein the second set of analog signals comprises a current associated with the output voltage and a voltage associated with the output voltage.

18. The system of claim 11, wherein the output current comprises an oscillating output current, wherein the transmitter is further configured to sample the oscillating output current a plurality of times within an oscillation period for the oscillating output current to generate a plurality of samples, to determine the peak value for the oscillating output current within the oscillation period from the plurality of samples, and to base the FOD signal at least in part upon the peak value.

19. The system of claim 11, wherein the two or more power levels comprises at least a lowest expected output power and a highest expected output power.

20. The system of claim 11, wherein the two or more power levels include at least three output power levels.

* * * * *